Patented Aug. 23, 1949

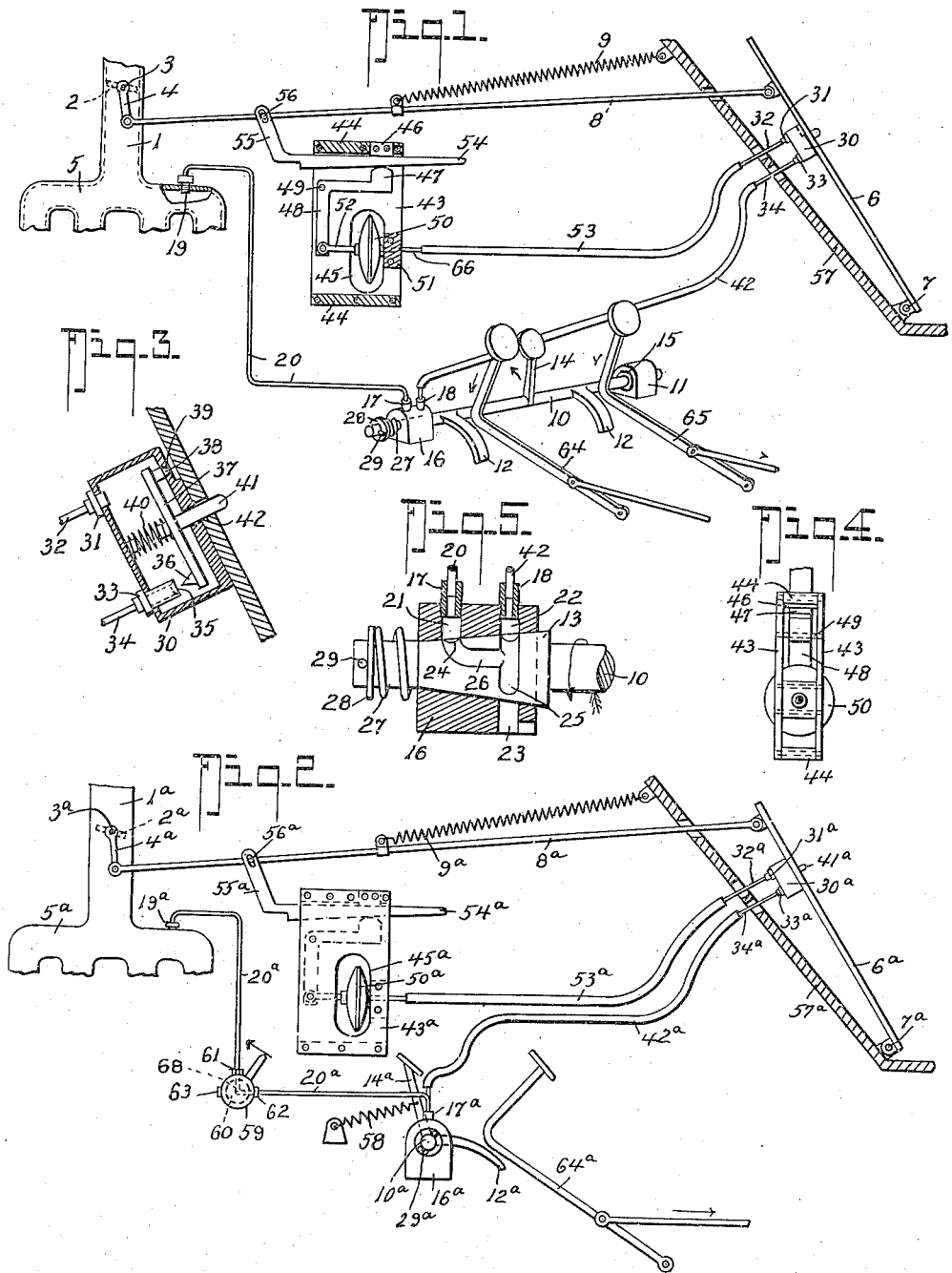

2,479,646

UNITED STATES PATENT OFFICE 2,479,646

THROTTLE CONTROL MECHANISM

Reuben T. Smith, Calhoun City, Miss.

Application May 31, 1946, Serial No. 673,578

5 Claims. (Cl. 192—.058)

In operating or driving motor vehicles which are propelled by a prime mover, and in the control of the power or speed of the prime mover, the operator frequently is obliged to maintain, for considerable periods of time, a certain setting of the throttle or control means against force, as for instance, a spring or counterweight tending to restore the control means to the "closed throttle" or "off" position. This results in the operator becoming fatigued.

My invention has for its object—

1. To provide a new and improved vacuum or suction operated, manually controlled means for automatically "locking" the throttle or control means in any desired "open" or "on" position.

2. To provide a valve mounted on the accelerator pedal or lever which is normally so set as to allow suction through the same from the locking device to the source of suction but when the operator is using the pedal or lever in the normal way, the valve will be connected to atmosphere and suction between the locking device and the valve will be cut off.

3. To provide a second valve connected in series with the accelerator pedal carried valve and connected between the valve on the accelerator pedal and the source of suction, which second valve is normally set to effect communication between the source of suction and the pedal-carried valve but which may be turned upon application of either or both the brake and clutch pedal of a motor vehicle to shut off such communication.

4. To provide a new and improved throttle holding or "locking" device operated by a suction or vacuum bellows, the device being preferably connected to the connecting rod between the throttle valve and the accelerator pedal.

Other objects will in part be obvious and in part be pointed out hereinafter.

To the attainment of the aforesaid objects and ends the invention further resides in the novel details of construction, combination and arrangement of parts all of which will be first fully described hereinafter and then be specifically pointed out in the appended claims, reference being had to the accompanying drawing, in which—

Fig. 1 is a diagrammatic view illustrating my invention.

Fig. 2 is a view similar to Fig. 1 but showing a slight modification.

Fig. 3 is an enlarged detail sectional view of the pedal-carried switch shown in Figs. 1 and 2.

Fig. 4 is a detail end elevation of the throttle "locking" device.

Fig. 5 is an enlarged detail section of the second valve.

Referring now to the accompanying drawing in which like numerals and letters of reference indicate like parts in all the figures, 1 represents the throttle valve duct to the intake manifold 5 of a motor vehicle engine, which manifold has established therein a suction or partial vacuum by action of the engine pistons and related parts during the so-called intake stroke of the pistons, in the engine cycle of operation. The valve shaft 3 carries the throttle valve 2 and has an arm 4 to which the connecting rod 8 from the accelerator pedal 6 is pivoted. The pedal 6 is hinged or pivoted at 7 to the foot board 57 of the vehicle in the usual manner. A spring 9 continuously tends to restore valve 2 to closed position when the accelerator pedal 6 is released. The spring may be connected at one end to the rod 8 and at the other end to the foot board 57.

A rock shaft 10 is located in proximity to the clutch and brake pedals 64, 65 respectively and has cams or fingers 12 to be engaged by those pedals when the brake or clutch or both are being operated. The shaft 10 is mounted in a support 11 having a bearing 15, and in a valve housing 16. The portion of the shaft 10 which is located within the housing 16 is formed into a tapered or plug valve 13. The valve 13 has a short groove 24 which registers with a port 21 and a semi-annular groove 25 which at times registers with the port 22 and at other times with the port 23. A cross groove 26 connects grooves 24 and 25. A spring 27 and washer 28 are held on the valve end of the shaft 10 by a pin 29. A nipple 17 connects a pipe or duct 20 with a port 21 while a nipple 18 connects a duct 42 with port 22. A plug fitting 19 effects a connection between duct 20 on manifold 5.

30 designates the housing of the pedal carried valve and 31 and 33 are fittings communicating with the interior of the housing 30, to which fittings pipes 32 and 33 are connected, respectively. The fitting 34 has a valve seat 35 (Fig. 3) which cooperates with a valve 36 and valve carrier 37 to which the push rod 41 which passes through a hole in the pedal 6, is secured and which also carries a valve 38 to engage the seat 39 of a port to atmosphere.

A spring 40 continuously tends to unseat valve 36, seat valve 38 and cause push rod 41 to project through the pedal 6.

The duct 42 includes a flexible portion that connects to the pipe 33.

The throttle valve "locking" device per se includes plates 43, spacers 44, a fixed clamp member 46, a movable clamp member 47 carried by a bell crank lever 48 that is pivoted at 49. It also includes a bellows 50 which is mounted at 51 and has a connecting rod 52 to lever 48 and a pipe 66 to which the flexible duct 53 connects. The duct 53 also connects to pipe 32. The plates 43 may have openings 45 when the diameter of the bellows used is greater than the space between the plates. The "locking" device per se also includes the tapered or wedge shaped bar 54 which has a portion 55 that is pivoted at 56 to the rod 8.

In the modified form of my invention shown in Fig. 2 those parts which are the same as corresponding parts in the preceding figures bear the same reference number plus the index letter $a$. In this figure a spring 58 is shown connected to lever 14a to continuously tend to move the shaft 10 so as to bring groove 25 of valve 13 and into register with port 22 (Fig. 5). A two-way valve 59 is connected in duct 20a.

The casing of the valve has ports 61, 62 and 63. Ports 61 and 62 are connected in the duct 20a while port 63 goes to atmosphere. Valve proper 60 has a right angle passage 68 to register with ports 61—62 or 61—63 according as the valve is in one position or the other.

Operation

Referring to the embodiment of my invention shown in Fig. 1, assume that shaft 10 is in such position that groove 25 is in register with port 23 and groove 24 is out of register with port 21. After the power or speed has been brought to the value desired the operator, with his foot on pedal 6 over plunger 41, holds the plunger down to open port 39 and close port at 35. This admits air to bellows 50 which expands under its own resiliency and releases clamp member 47. So long as he keeps his foot on the pedal 6 and holds plunger 41 in he may use the pedal in the ordinary manner.

When, however, he desires to set the throttle valve and rest his foot, he presses on pedal 14 (while holding his other foot on pedal 6) to turn shaft 10 counter-clockwise to bring groove 24 into register with port 21 and bring groove 25 out of register with port 23 and into register with port 22. He then slides his foot off plunger 41 to permit spring 40 to move carrier 37 and plunger 41 outwardly, thereby opening communication at 35 and closing port 38.

The suction from manifold 5, acting via duct 20, valve device 16, duct 42, valve device 30 and duct 53 to bellows 50 causes the bellows to collapse and draw rod 52 from left to right in Fig. 1 and thereby cause clamp member 47 to clamp, "lock," bar 54 in place. By tapering the bar 54 as shown, the action of the springs 9 tends to wedge the bar in place between clamp members 46 and 47 and yet permits easy withdrawal of the bar when pedal 6 is pushed down even though the suction is still acting on bellows 50.

To meet a few conditions where it might be desirable that clamping action be resumed after releasing pedals 64, 65 without the necessity of depressing pedal 14 again, the spring 58 will hold the valve 13 in the position shown in Fig. 5. (In the event that spring 58 is added the cut-off valve device 59 will serve as a means by which the suction can be cut-off and the bellows bled to render the "locking" device unoperative.)

When the operator desires to increase the power or speed he again puts his foot on pedal 6 while holding plunger 41 in position. This immediately cuts off suction and bleeds the bellows thereby releasing clamp member 47. He then adjusts pedal 6 to give the desired speed, removes his foot from plunger 41 and rests.

The drawing and above description thereof illustrate and describe preferred embodiments of the invention which, however, may be modified within the scope of the appended claims.

Applicant is the same applicant who, on even date herewith, filed applications Serial No. 673,577 and No. 673,579.

What I claim is:

1. In apparatus of the class described wherein is provided a throttle valve, an accelerator lever and a power transmitting connection between said accelerator lever and said throttle valve, and wherein is provided a clutch pedal and a brake pedal and a suitable source of suction: the improvement which includes a suction-operated device operatively connected with said power transmitting connection for holding said throttle valve in a predetermined position; a duct from said suitable source of suction to said device for operating the device; a control valve mounted on said accelerator lever in a position for independent operation at any position of said lever and connected in said duct and normally held in position to leave the duct passage open in order that the accelerator lever may be free for normal operation, said control valve having a control-plunger associated with said accelerator lever to be engaged by the operator desiring to operate said lever; a second control valve in said duct normally held in a position so as to operatively open the duct passage to atmosphere; a manually operable lever operatively connected with said second control valve to set said second control valve to open said duct passage and close off the atmosphere communication; and means operatively connected with said second control valve and operable by said brake and clutch pedals for resetting said second valve to close the duct passage and bleed the duct via the first valve to atmosphere.

2. In apparatus of the class described wherein is provided a throttle valve, an accelerator member, a power transmitting connection between said accelerator member and said throttle valve, a suitable source of suction, a clutch pedal and a brake pedal: the improvement which includes a suction operated device for holding said throttle valve in any desired position; a valve device carried by said accelerator member and having two valve-controlled ports one of which is to atmosphere; a second section of a suction duct having one end connected to the other of said two valve-controlled ports; a valve carrier for said valves and having a plunger cooperatively positioned with respect to said accelerator member; a third section of said suction duct having one end connected with said accelerator-carried valve device and having its other end connected with said suction operated device; a second valve device which includes a valve case having a port to atmosphere and having two other ports, and having a valve proper with grooves for controlling communication between said two other ports and the port to atmosphere; a first section of said suction duct, one end of which is connected with said source of suction and the other end of which is connected to one of said two other ports, the other end of said second suction duct being connected to the other of said two other ports; said valve proper being normally positioned to open said port to atmosphere and close communication between said two other ports; manually operated means for moving said valve proper to close the port to atmosphere and connect the other two ports together; and means operable by the brake and clutch pedals for restoring said valve proper to its normal position.

3. In apparatus of the class described wherein is provided a throttle valve, an accelerator member, a power transmission connection between said accelerator member and said throttle valve, a suitable source of suction, a clutch pedal and a brake pedal: the improvement which includes a suction-operated device for holding said throttle valve in any desired position; said device including a bar connected to said power transmitting connection, a clamp for holding said bar in position and comprisng two members at least one of which is movable, a bellows connected with the movable clamp member and operable by suction to effect a clamping action of the same; means for operatively connecting and disconnecting said bellows to and from said source of suction for purposes described, said last named means including a suction duct between said source of suction and said suction-operated device, a control valve in said duct and mounted on said accelerator member and a second control valve in said duct and means for operating said second control valve in one direction by said clutch and brake pedals.

4. In apparatus of the class described wherein is provided a throttle valve, an accelerator member, a power transmitting connection between said accelerator member and said throttle valve, a suitable source of suction, a clutch pedal and a brake pedal: the improvement which includes a suction-operated device for holding said throttle valve in any desired position; said device including a bar connected to said power transmitting connection, a clamp for holding said bar in position and comprising two members at least one of which is movable, a bellows connected with the movable clamp member and operable by suction to effect a clamping action of the same; means for operatively connecting and disconnecting said bellows to and from said source of suction for purposes described, said last named means including a suction duct between said source of suction and said suction-operated device, a control valve in said duct and mounted on said accelerator member and a second control valve in said duct between the first mentioned control valve and the source of suction and means for operating said second control valve in one direction by the clutch and brake levers, and means to operate said second control valve in the opposite direction at will for purposes described.

5. In apparatus of the class described wherein is provided a throttle valve, an accelerator member, a power transmitting connection between said accelerator member and said throttle valve, a suitable source of suction, a clutch pedal and a brake pedal: the improvement which includes a suction-operated device for holding said throttle valve in any desired position; said device including a bar connected to said power transmitting connection, a clamp for holding said bar in position and comprising two members at least one of which is movable, a bellows connected with the movable clamp member and operable by suction to effect a clamping action of the same; means for operatively connecting and disconnecting said bellows to and from said source of suction for purposes described, said last means including a suction duct between said source of suction and said suction-operated device, a control valve in said duct and mounted on said accelerator member and a second control valve in said duct between the first mentioned control valve and the source of suction and means for operating said second control valve in one direction by the clutch and brake levers, means continuously tending to move said second control valve in the opposite direction, and a shut-off valve in said duct between the source of suction and said second control valve for purposes described.

REUBEN T. SMITH.

REFERENCES CITED

The following references are of record in the file of this patent:

UNITED STATES PATENTS

| Number | Name | Date |
| --- | --- | --- |
| 2,066,667 | Bellis | Jan. 5, 1937 |
| 2,116,556 | Bellis | May 10, 1938 |
| 2,423,006 | Chambers | June 24, 1947 |

FOREIGN PATENTS

| Number | Country | Date |
| --- | --- | --- |
| 513,913 | Germany | Dec. 4, 1930 |